United States Patent
Jun et al.

(10) Patent No.: US 9,007,670 B2
(45) Date of Patent: Apr. 14, 2015

(54) INJECTION MOLDINGS, INJECTION-MOLDING APPARATUS AND METHOD THEREOF

(75) Inventors: Hyun-Woo Jun, Gyeongsangnam-Do (KR); Young-Bae Kim, Busan (KR); Chang-Il Jung, Gyeongsangnam-Do (KR); Seok-Jae Jeong, Gyeongsangnam-Do (KR); Hyung-Pyo Yoon, Gyeongsangnam-Do (KR)

(73) Assignee: LG Electronics Inc., Seoul (KR)

( * ) Notice: Subject to any disclaimer, the term of this patent is extended or adjusted under 35 U.S.C. 154(b) by 1110 days.

(21) Appl. No.: 12/675,637

(22) PCT Filed: Aug. 28, 2007

(86) PCT No.: PCT/KR2007/004138
§ 371 (c)(1),
(2), (4) Date: Sep. 2, 2010

(87) PCT Pub. No.: WO2009/028745
PCT Pub. Date: Mar. 5, 2009

(65) Prior Publication Data
US 2011/0069361 A1 Mar. 24, 2011

(51) Int. Cl.
*G03H 1/04* (2006.01)
*B29C 45/37* (2006.01)
(Continued)

(52) U.S. Cl.
CPC ....... *B29C 45/372* (2013.01); *Y10T 428/24802* (2015.01); *B29C 45/2632* (2013.01);
(Continued)

(58) Field of Classification Search
CPC .......... Y10T 428/24802; B29C 45/04–45/062; B29C 45/2673–45/2675; B29C 45/263–45/2642; B29C 2045/2634–2045/2667; B29C 45/372–45/374; B29C 45/73–45/7337; B29C 2045/7318–2045/7393; B29K 2995/0093; B29L 2031/7224
USPC ........ 359/2, 35; 264/405, 449, 451, 453, 500, 264/512, 513, 537, 239, 297.2, 328.1, 264/328.7–328.19, 1.31, 1.34, 1.35; 425/542, 591, 547, 548, 552; 428/195.1, 42.1, 66.5
See application file for complete search history.

(56) References Cited

U.S. PATENT DOCUMENTS
6,955,781 B2 * 10/2005 Yusa et al. .................... 264/162
7,540,989 B2 6/2009 Kang
(Continued)

FOREIGN PATENT DOCUMENTS
CN 1727169 A 2/2006
EP 1800829 A1 6/2007
(Continued)

OTHER PUBLICATIONS
Korean Office Action dated Sep. 20, 2011 for Application No. 10-2009-7025326, Non-English language, 3 pages.
(Continued)

*Primary Examiner* — Stephone B Allen
*Assistant Examiner* — James McGee
(74) *Attorney, Agent, or Firm* — Fish & Richardson P.C.

(57) ABSTRACT

Disclosed are injection moldings, an injection-molding apparatus and a method thereof. The injection-molding apparatus comprises: a cavity mold having a cavity; a core mold having a core surface to form a molding space for injection moldings when being joined to the cavity mold; a heating unit for heating the cavity mold or the core mold; a cooling unit for cooling the cavity mold or the core mold; and a patterning stamp having a micrometer or nanometer sized pattern and provided on an inner surface of the molding space. According to the injection-molding apparatus, a micrometer or nanometer sized pattern is formed on a surface of injection moldings so as to have a super-hydrophobic characteristic and an optical characteristic, and a micrometer or nanometer sized pattern of a complex structure can be implemented.

20 Claims, 4 Drawing Sheets

(51) Int. Cl.
   *B29C 45/26*    (2006.01)
   *B29C 45/73*    (2006.01)
   *B29L 31/00*    (2006.01)

(52) U.S. Cl.
   CPC ..... *B29C45/2642* (2013.01); *B29C 2045/7343* (2013.01); *B29C 2045/735* (2013.01); *B29C 45/73* (2013.01); *B29K 2995/0093* (2013.01); *B29L 2031/7224* (2013.01); *B29C 45/2675* (2013.01); *B29C 2045/7393* (2013.01)

(56)  References Cited

U.S. PATENT DOCUMENTS

| | | | |
|---|---|---|---|
| 2003/0197905 A1* | 10/2003 | Gelardi et al. | 359/1 |
| 2003/0215540 A1 | 11/2003 | Asai | |
| 2007/0012572 A1 | 1/2007 | Lee et al. | |
| 2007/0191761 A1 | 8/2007 | Boone et al. | |
| 2008/0054529 A1 | 3/2008 | Kang | |
| 2009/0068306 A1 | 3/2009 | Jaderberg et al. | |
| 2009/0212464 A1 | 8/2009 | Kang | |

FOREIGN PATENT DOCUMENTS

| | | |
|---|---|---|
| JP | 07-144353 A | 6/1995 |
| JP | 09-066531 A | 3/1997 |
| KR | 10-0436699 B1 | 6/2004 |
| KR | 10-2006-00325946 A | 4/2006 |
| KR | 10-0605613 B1 | 8/2006 |
| KR | 10-0644920 B1 | 11/2006 |
| KR | 10-2006-0130291 A | 12/2006 |
| KR | 10-0734948 B1 | 7/2007 |
| WO | WO 2005/082596 A1 | 9/2005 |
| WO | WO 2006/112571 A1 | 10/2006 |

OTHER PUBLICATIONS

International Search Report dated May 28, 2008 for Application No. PCT/KR2007/004138, 3 pages.

Supplemental European Search Report dated Mar. 20, 2013 for Application No. EP 07793732, 6 pages.

Chinese Office Action dated dated Mar. 30, 2012 for Application No. 2007801000064.7, in English, 10 pages.

Korean Office Action dated Apr. 30, 2012 for Application No. 10-2009-7025326, 5 pages.

* cited by examiner

INJECTION MOLDINGS, INJECTION-MOLDING APPARATUS AND METHOD THEREOF

TECHNICAL FIELD

The present invention relates to injection moldings, and more particularly, to injection moldings, an injection-molding apparatus and a method thereof, in which a pattern of a micrometer or nanometer size can be simply formed on a surface of injection moldings so as to have a super-hydrophobic characteristic and an optical characteristic, and a micrometer or nanometer sized pattern of a complex structure can be implemented.

BACKGROUND ART

Generally, a refrigerating cycle device is provided at a refrigerator, an conditioner, etc. The refrigerating cycle device includes a condenser and an evaporator. The condenser performs heat exchange with peripheral air by emitting heat outwardly, and the evaporator performs heat exchange with peripheral air by absorbing external heat. The condenser and the evaporator are called as a heat exchanger.

As the heat exchanger for an evaporator absorbs external heat, moisture is condensed on a surface of the heat exchanger for an evaporator thereby to form droplets. As the droplets are frozen, frost is generated. The frost lowers an efficiency of the heat exchanger, thereby being periodically removed by a defrosting device.

In order to enhance an efficiency of the heat exchanger, the heat exchanger is processed so as to have a super-hydrophobic characteristic thereon. Since the surface of the heat exchanger having a super-hydrophobic characteristic has a structure of a micrometer or nanometer size, a surface friction due to a fluid is decreased and thereby droplets are effectively removed.

A method for processing a surface of a heat exchanger includes a plasma enhanced chemical vapor deposition (PECVD), a plasma polymerization, polypropylene, a nano-structured carbon film, etc.

The above methods serve to change a shape of a surface of the heat exchanger through complicated chemical processes, or serve to implement a surface of the heat exchanger having a hydrophobic characteristic by changing a surface energy of a material. The above methods require expensive processes or long processing time, thereby having a difficulty in being utilized for a massive production.

Injection moldings formed of a plastic material or a product formed of a plastic material is provided with a micrometer or nanometer sized pattern thereon so as to have a super-hydrophobic characteristic or an optical characteristic. In order to form a micrometer or nanometer sized pattern on a surface of a product or injection moldings formed of a plastic material, the plastic moldings have to undergo an injection-molding process. Then, the plastic moldings undergo a post-processing such as a printing process, a stamping process or a surface machining process.

However, the post-processing requires a high cost. A hot-stamping process is widely used to form a micrometer or nanometer sized pattern. However, the hot-stamping process can be applied to form a simple pattern, but can not be applied to form a complicated pattern having a hydrophobic characteristic, etc.

DISCLOSURE OF THE INVENTION

Therefore, it is an object of the present invention to provide injection moldings, an injection-molding apparatus and a method thereof, in which a pattern of a micrometer or nanometer size can be simply formed on a surface of injection moldings so as to have a super-hydrophobic characteristic and an optical characteristic, and a micrometer or nanometer sized pattern of a complex structure can be implemented.

To achieve these objects, there is provided an injection-molding apparatus, comprising: a cavity mold having a cavity; a core mold having a core surface to form a molding space for injection moldings when being joined to the cavity mold; a heating unit for heating the cavity mold or the core mold; a cooling unit for cooling the cavity mold or the core mold; and a patterning stamp having a micrometer or nanometer sized pattern and provided on an inner surface of the molding space.

The patterning stamp may be provided both on an inner surface of the cavity of the cavity mold and on the core surface of the core mold.

The patterning stamp is mounted at the cavity mold or the core mold by a stamp fixing unit.

The patterning stamp may be fixed to the cavity mold or the core mold by a vacuum.

According to another aspect of the present invention, there is provided an injection-molding apparatus comprising: a cavity mold having a cavity; a core mold having a core surface to form a molding space for injection moldings when being joined to the cavity mold; a heating unit for heating the cavity mold or the core mold; a cooling unit for cooling the cavity mold or the core mold; and a micrometer or nanometer sized pattern provided on an inner surface of the molding space.

The pattern is provided on an inner surface of the cavity of the cavity mold and on the core surface of the core mold.

Injection moldings fabricated at injection moldings space formed by the cavity of the cavity mold and the core surface of the core mold have an optical characteristic of a hologram on a partial surface or an entire surface thereof.

Injection moldings fabricated at injection moldings space formed by the cavity of the cavity mold and the core surface of the core mold have a super-hydrophobic characteristic on a partial surface or an entire surface thereof.

To achieve these objects, there is also provided an injection-molding method, comprising: heating a cavity mold into a preset temperature; engaging the cavity mold with a core mold when the cavity mold is heated to the preset temperature; injecting a melted molding material into a molding space formed by the cavity of the cavity mold and the core surface of the core mold; cooling the cavity mold and the core mold; and separating the cavity mold and the core mold from each other, thereby obtaining injection moldings.

To achieve these objects, there is still also provided injection moldings fabricated by an injection-molding apparatus having a patterning stamp on which a pattern is formed in a molding space, in which the injection moldings has a micrometer or nanometer sized pattern on a surface thereof.

MODES FOR CARRYING OUT THE PREFERRED EMBODIMENTS

Reference will now be made in detail to the preferred embodiments of the present invention, examples of which are illustrated in the accompanying drawings.

Hereinafter, an injection-molding apparatus and a method thereof according to the present invention will be explained in more detail with reference to the attached drawings.

Figure 1:
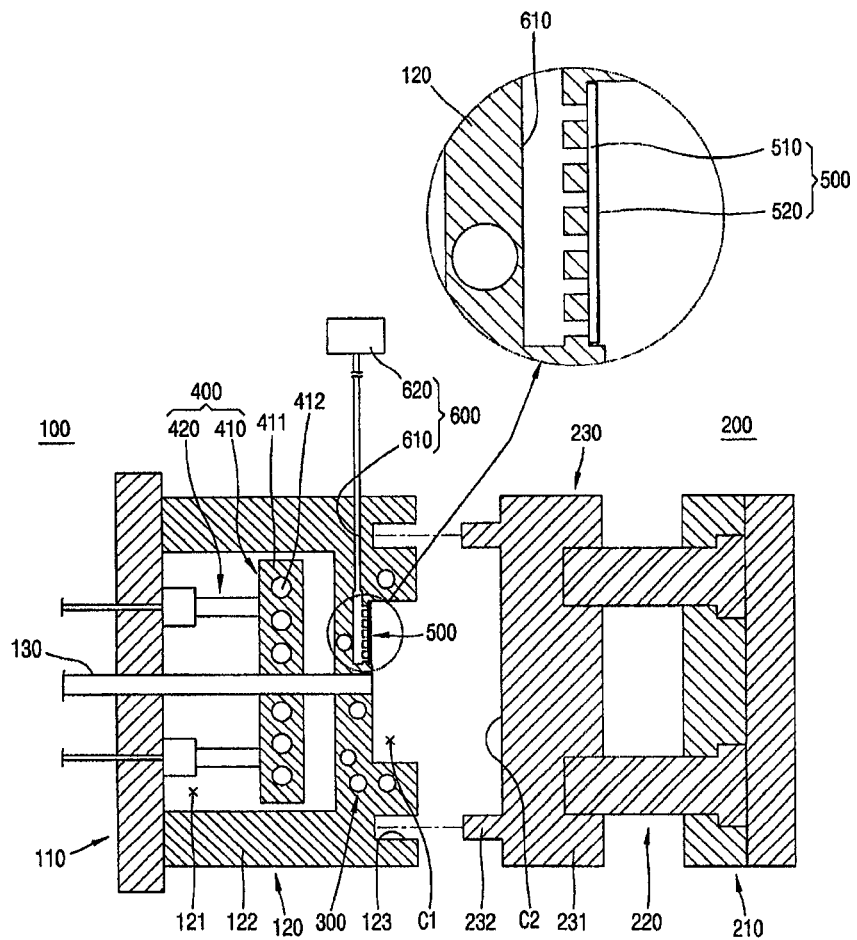
FIG. 1 is a front sectional view showing an injection-molding apparatus according to a first embodiment of the present invention.

FIG. 1 is a front sectional view showing an injection-molding apparatus according to a first embodiment of the present invention.

As shown, the injection-molding apparatus comprises a cavity mold 100 having a cavity C1; a core mold 200 having a core surface C2 to form a molding space C for injection moldings when being joined to the cavity mold 100.

The cavity mold 100 includes a base member 110; a body member 120 having the cavity C1 at one side thereof, having a receiving space 121 at an opposite side to the cavity C1, and fixedly-coupled to the base member 110; and an injecting pipe 130 coupled to the body member 120 so as to be communicated with the cavity C1, for injecting a melted molding material.

The base member 110 is formed to have a certain area.

The body member 120 includes a body portion 122 having a certain shape; the cavity C1 formed on one surface of the body portion 122 so as to have one opened side; a coupling recess 123 formed on one surface of the body portion 122 so as to be disposed at a periphery of the cavity C1; and the receiving space 121 formed at the body portion 122 so as to be disposed at an opposite side to the cavity C1. The receiving space 121 is formed at the body portion 122 of the body member 120 so as to have a certain size and depth, and one side of the receiving space 121 is opened. A partition wall is formed between the receiving space 121 and the cavity C1.

The core mold 200 includes a base member 210, a plurality of connection members 220 having a certain length and coupled to the base member 210, and a core body 230 having a core surface C2 and coupled to the plurality of connection members 220.

The core body 230 includes a body portion 231 having a certain shape, the core surface C2 that forms the molding space C together with the cavity C1, and a coupling protrusion 232 protruding from a periphery of the core surface C2 and inserted into the coupling recess 123 of the cavity mold 100.

The molding space C formed by the cavity C1 of the cavity mold 100 and the core surface C2 of the core mold 200 may have variously forms according to a shape of injection moldings to be injected.

A heating unit 300 for heating the cavity mold 100 is provided at the cavity mold 100.

The heating unit 300 includes an electro-thermal wire disposed at the body member 120 of the cavity mold 100 so as to be disposed at a periphery of the cavity C1, and a wire for supplying electricity to the electro-thermal wire.

The heating unit 300 may be provided at the core mold 200.

A cooling unit 400 for selectively cooling the cavity mold 100 is provided at the cavity mold 100.

The cooling unit 400 includes a cooling plate 410 movably disposed at the receiving space 121 of the body member 120 of the cavity mold 100, and a driving unit 420 for reciprocating the cooling plate 410 thereby contacting/separating the cooling plate 410 onto/from an inner surface of the cavity C1.

The cooling plate 410 includes a plate 411 having a certain area, and a passage 412 disposed in the plate 411 and through which a cooling medium flows. Preferably, the cooling plate 410 is formed of a copper material.

Preferably, the driving unit 420 includes a hydraulic cylinder connected to the cooling plate 410 for linearly reciprocating the cooling plate 410.

The driving unit 420 may be implemented as various devices.

When the cavity mold 100 is cooled by the cooling unit 400, the cooling plate 410 is moved by the driving unit 420 thus to contact an inner surface of the receiving space 121. Here, the inner surface of the receiving space 121 is the closest to the cavity C1. As the cooling plate 410 contacts an inner surface of the receiving space 121, cool air generated from the cooling plate 410 cools the cavity C1 via the body portion 122 of the body member 120 of the cavity mold 100. However, when the cooling operation for the cavity mold 100 is stopped, the cooling plate 410 is moved by the driving unit 420 thereby to be separated from the inner surface of the receiving space 121.

The cooling unit 400 may be provided at the core mold 200.

A patterning stamp 500 having a micrometer or nanometer sized pattern is provided on an inner surface of the cavity C1 of the cavity mold 100.

The patterning stamp 500 is fixed to the cavity mold 100 by a stamp fixing unit 600.

The stamp fixing unit 600 can fix the patterning stamp 500 by using a vacuum. The stamp fixing unit 600 includes a suction passage 610 formed at the cavity mold 100 so as to be communicated with the cavity C1 of the cavity mold 100, and a vacuum generating unit 620 for sucking the patterning stamp 500 disposed in the cavity C1 to an inner surface of the cavity C1 by applying a vacuum to the suction passage 610.

When the patterning stamp 500 is positioned on the inner surface of the cavity C1 of the cavity mold 100 and then a vacuum is applied to the suction passage by the vacuum generating unit 620, the patterning stamp 500 is fixed to the inner surface of the cavity C1 by the vacuum. A clamp for support-fixing the patterning stamp 500 may be further provided.

Figure 2:
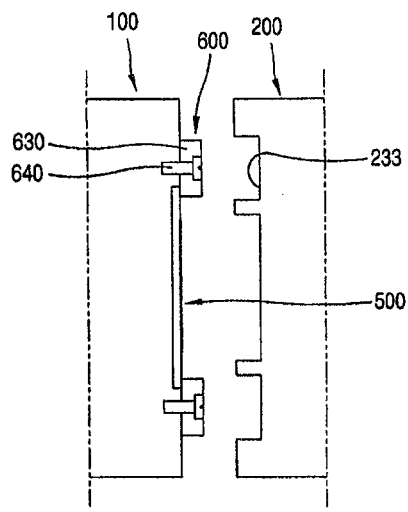
FIG. 2 is a sectional view showing a stamp fixing unit of the injection-molding apparatus of FIG. 1.

As another embodiment, the stamp fixing unit 600 is implemented as the clamp. As shown in FIG. 2, the stamp fixing unit 600 includes a supporting member 630 for supporting the patterning stamp 500; and a coupling member 640 coupled to the supporting member 630 and the cavity mold 100, for fixing/releasing the patterning stamp 500 by pressurizing/releasing the supporting member 630.

A receiving recess 233 for receiving the stamp fixing unit 600 when being joined to the cavity mold 100 is provided at one side of the core mold 200.

The patterning stamp 500 has a certain pattern 520 on one surface of the stamp 510 having a certain area. The pattern 520 may be formed on a partial or entire surface of the stamp 510. The pattern 520 formed at the stamp 510 has a micrometer or nanometer sized structure.

A method for forming the pattern 520 on the stamp 510 includes a Biomimetics method. The Biomimetics method includes a sputtering process, an adhesive bonding process, a gold coating process, a nickel electro-forming process, a stripping process, etc., which is disclosed in the Patent No. 10-2005-0063692.

A desire complicated pattern can be formed on the stamp by using the Biomimetics method.

A method for processing the patterning stamp 500 includes a mechanical process, a laser process, an LICA process, a semiconductor fabricating process, a MEMS process, etc.

As the method for forming the pattern 520 on the stamp 510, various methods rather than the above methods may be used.

Preferably, the patterning stamp 500 is formed of a nickel material.

The patterning stamp 500 may be formed of a planar plate or a curved plate.

Figure 3:
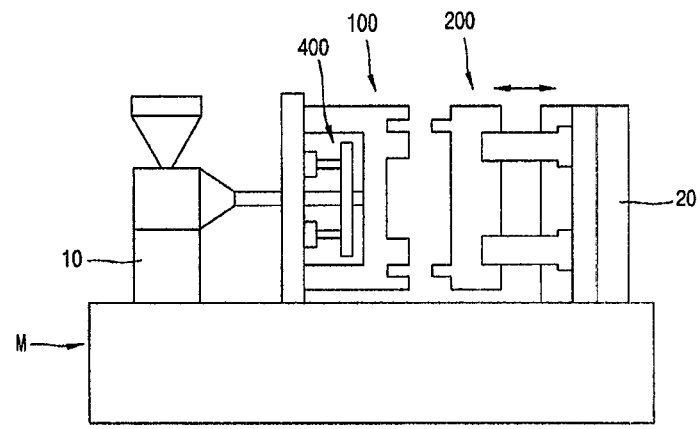
FIG. 3 is a front view showing an injection-molding machine having the injection-molding apparatus of FIG. 1.

As shown in FIG. 3, the cavity mold 100 having the heating unit 600, the cooling unit 400, and the patterning stamp 500 is preferably fixed to a fixing unit 10 of an injection molding machine (M). Preferably, the core mold 200 is mounted at a mover 20 of the injection molding machine (M). As the mover 20 is operated, the core mold 200 is moved, and thereby the cavity mold 100 and the core mold 200 are joined to each other or separated from each other.

The patterning stamp 500 may not be mounted on the inner surface of the cavity C1 of the cavity mold 100, but may be mounted on the core surface C2 of the core mold 200.

The patterning stamp 500 may be provided on the core surface C2 of the core mold 200 by the stamp fixing unit. The stamp fixing unit may have the aforementioned configuration.

The patterning stamp 500 may be provided on the inner surface of the cavity C1 of the cavity mold 100, and the core surface C2 of the core mold 200, respectively. In this case, the pattering stamp 500 is fixed to the inner surface of the cavity C1 of the cavity mold 100 and the core surface C2 of the core mold 200 by the stamp fixing unit.

Figure 4:
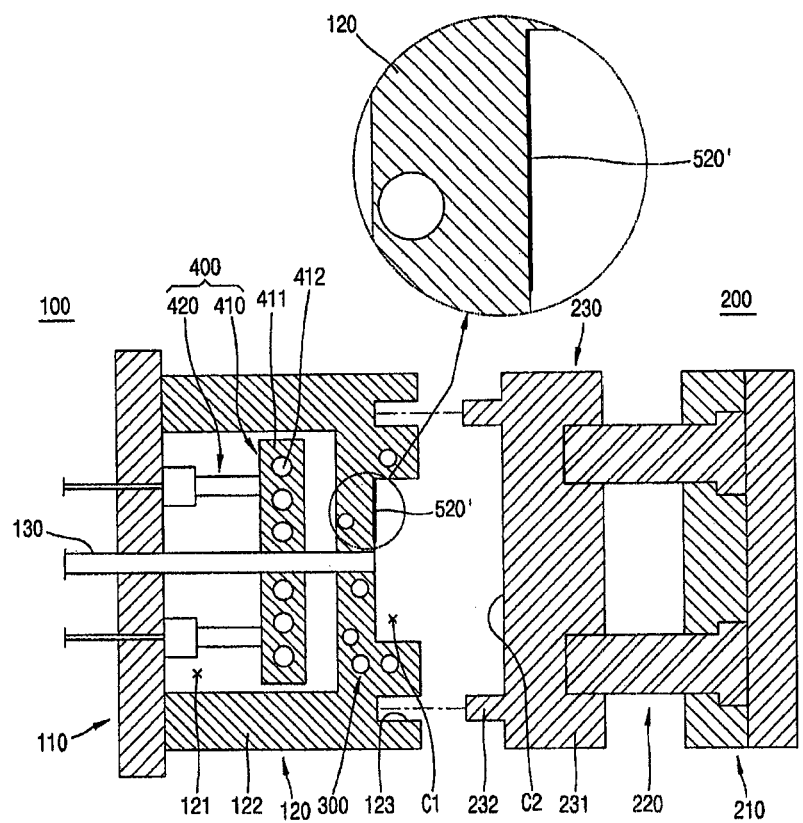
FIG. 4 is a front sectional view showing an injection-molding apparatus according to a second embodiment of the present invention.

FIG. 4 is a front sectional view showing an injection-molding apparatus according to a second embodiment of the present invention.

As shown, the injection-molding apparatus comprises a cavity mold 100 having a cavity C1; a core mold 200 having a core surface to form a molding space C together with the cavity C1 when being joined to the cavity mold 100; a heating unit 300 for heating the cavity mold 100 or the core mold 200; a cooling unit 400 for cooling the cavity mold 100 or the core mold 200; and a pattern 520' having a micrometer or nanometer sized structure directly formed on an inner surface of the molding space C.

The cavity mold 100, the core mold 200, the heating unit 300, and the cooling unit 400 have the same configuration as those of the first embodiment.

The pattern 520' may be formed on an entire or partial inner surface of the cavity C1 of the cavity mold 100.

The pattern 520' formed on the inner surface of the cavity C1 of the cavity mold 100 has a micrometer or nanometer sized structure.

A method for forming the pattern 520' on the inner surface of the cavity C1 of the cavity mold 100 may include a mechanical process, a laser process, an LIGA process, a semiconductor fabricating process, a MEMS process, etc.

According to the mechanical process, a pattern having a size corresponding to approximately 1 micrometer can be implemented. According to the laser process, a pattern having a size corresponding to several micrometers can be implemented. According to the semiconductor fabricating process, the cavity mold 100 undergoes a coating process, an etching process, etc., thereby forming a pattern on the inner surface of the cavity C1 of the cavity mold 100.

The pattern 520' may be formed on the core surface C2 of the core mold 200, not on the inner surface of the cavity C1 of the cavity mold 100.

The pattern 520' may be respectively formed on the core surface C2 of the core mold 200 and on the inner surface of the cavity C1 of the cavity mold 100.

The injection-molding apparatus was explained based on the first and second embodiments of the present invention. However, various techniques may be implemented.

Figure 5:
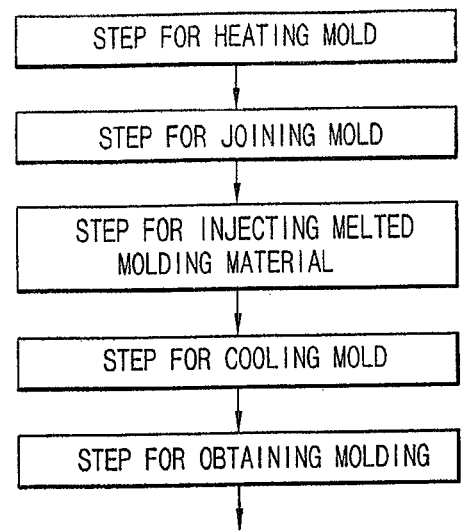
FIG. 5 is a flowchart showing an injection-molding method according to the present invention.

FIG. 5 is a flowchart showing an injection-molding method according to the present invention.

As shown, the injection-molding method comprises: heating the cavity mold 100 into a preset temperature; and engaging the cavity mold 100 with the core mold 200 when the cavity mold 100 is heated to the preset temperature.

Preferably, the cavity mold 100 is heated at a temperature of 120° C. which is less than a melting temperature for injection moldings.

Once the temperature of the cavity mold 100 is risen, a melted molding material such as resin has an enhanced flow/transfer characteristic, and has a low viscosity. Accordingly, the melted molding material is smoothly sucked into the pattern of the patterning stamp 500, thereby being directly patterned on a surface of the injection moldings.

Then, a step for injecting the melted molding material into a molding space formed by the cavity C1 of the cavity mold 100 and the core surface C2 of the core mold 200 is performed. Then, a step for cooling the cavity mold 100 and the core mold 200 after the melted molding material is injected into the molding space is performed.

Then the cavity mold 100 and the core mold 200 are separated from each other, thereby obtaining injection moldings disposed at the molding space C.

The temperature of the melted molding material can be risen by heating only the cavity mold 100 or only the core mold 200.

Hereinafter, an operation of the injection-molding apparatus will be explained.

According to the injection-molding apparatus according to the first embodiment, when power is supplied to the wire of the heating unit 300 under a state that the cavity mold 100 mounted at the fixing unit 10 of the injection molding machine (M) is spaced from the core mold 200 mounted at the mover 20 of the injection molding machine (M) with a certain distance, heat is generated from the electro-thermal wire thereby to heat the cavity mold 100.

Since the heating unit 300 is disposed at a periphery of the cavity C1, the cavity C1 is heated more rapidly than other parts. Herein, the cavity mold 100 does not come in contact with the cooling unit 400.

Figure 6:
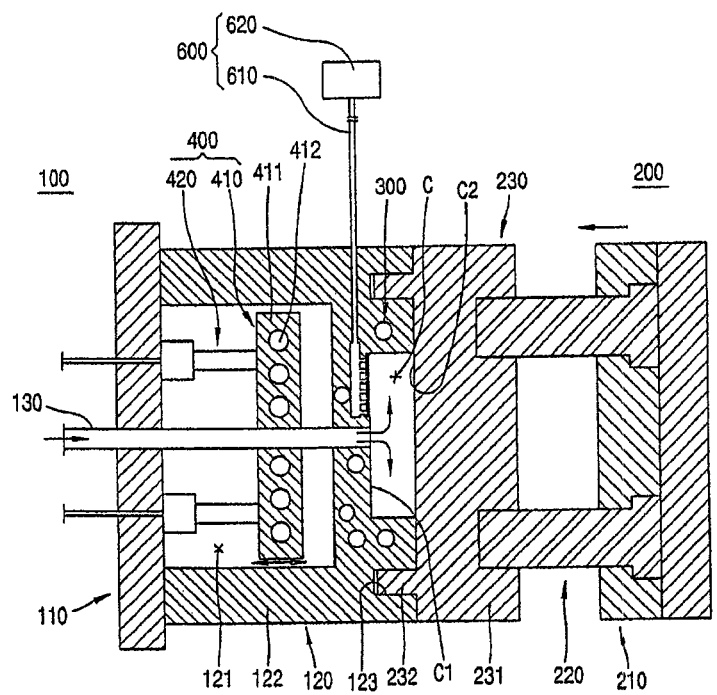
FIGS. 6 and 7 are front sectional views showing an operation state of the injection-molding apparatus according to a first embodiment of the present invention, respectively.

When the cavity C1 of the cavity mold 100 is heated into a preset temperature, the cavity mold 100 and the core mold 200 are joined to each other as the core mold 200 is moved by the mover 20 of the injection molding machine (M) as shown in FIG. 6. When the cavity mold 100 is heated into the preset temperature, the power supplied to the heating unit 300 is stopped.

When a melted molding material is injected into the injecting pipe 130 of the cavity mold 100, the melted molding material is introduced into the molding space C through the injecting pipe 130 thereby to fill the molding space C. Since the mold and the molding space have a high inner temperature, the melted molding material has an enhanced flow/transfer characteristic and a low viscosity. As a result, the melted molding material is rapidly filled in the molding space, and is sufficiently introduced into the pattern 520 formed on the patterning stamp 500.

While the melted molding material is injected into the molding space C, the driving unit 420 is operated thereby to contact the cooling plate 410 to the inner surface of the receiving space 121. As the cooling plate 410 contacts the inner surface of the receiving space 121, the cavity mold 100 is cooled thereby to harden the melted molding material filled in the molding space C.

Figure 7:
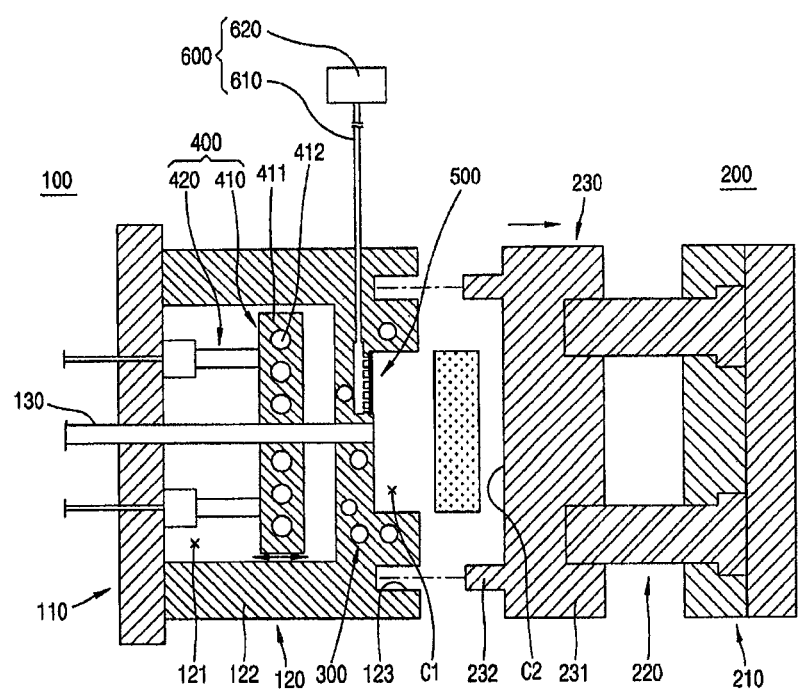

As shown in FIG. 7, the cavity mold 100 and the core mold 200 are separated from each other by moving the core mold 200, thereby obtaining the injection moldings formed in the molding space C. While the cavity mold 100 and the core mold 200 are separated from each other, the cavity mold 100 is heated to a preset temperature.

The above process is repeated, thereby fabricating injection moldings.

When the pattern 520 of the patterning stamp 500 is damaged, the pattern 520 is replaced by a new patterning stamp 500. When another pattern is to be formed on a surface of the injection moldings, the patterning stamp 500 is replaced by a new one. Since the patterning stamp 500 can be replaced by a new one, various patterns can be formed on the surface of the injection moldings. Also, when the pattern 520 of the patterning stamp 500 is damaged, the patterning stamp 500 can be easily replaced by a new one.

The melted molding material has an enhanced flow/transfer characteristic and has a low viscosity by heating the cavity mold 100, thereby forming a micrometer or nanometer sized pattern on a surface of the injection moldings.

The pattern formed on the partial or entire surface of the injection moldings has a micrometer or nanometer size. The surface of the injection moldings on which the pattern is formed has an optical characteristic of rainbow colors of a hologram, a super-hydrophobic characteristic, a stainless hair line finishing characteristic, etc.

The injection moldings may be formed of synthetic resin-based materials, or may be formed of various materials such as aluminum.

An operation of the injection-molding apparatus according to the second embodiment of the present invention will be explained.

The operation of the injection-molding apparatus according to the second embodiment of the present invention is the same as the operation of the injection-molding apparatus according to the first embodiment of the present invention. The pattern is formed on the surface of the injection moldings obtained in the molding space by a pattern formed on the inner surface of the cavity C1 of the cavity mold 100, or a pattern formed on the core surface C2 of the core mold 200.

The pattern formed on the surface of the injection moldings has a micrometer or nanometer size. The surface of the injection moldings on which the pattern is formed has an optical characteristic of rainbow colors of a hologram, a super-hydrophobic characteristic, a stainless hair line finishing characteristic, etc. In order for the pattern formed on the surface of the injection moldings to have a hydrophobic characteristic, a contact angle between the pattern and water has to be more than 90°. In order for the pattern formed on the surface of the injection moldings to have a super-hydrophobic characteristic, a contact angle between the pattern and water has to be more than 150°.

When a pattern formed on the cavity mold 100 or the core mold 200 is damaged, the cavity mold 100 or the core mold 200 is replaced by a new one.

In order for a pattern formed on a surface of the injection moldings fabricated according to the first embodiment or the second embodiment to have an optical characteristic of rainbow colors of a hologram, the injection moldings are preferably formed of a polycarbonate-based plastic material. When the injection moldings are formed of a polycarbonate-based plastic material, a hologram effect can be maximized.

In order for the pattern formed on the surface of the injection moldings to have a super-hydrophobic characteristic, an ABS-based resin is preferably used.

In the present invention, a micrometer or nanometer sized pattern is formed on an inner surface of the molding space of the cavity mold 100 or the core mold 200, and the patterning stamp 500 having the pattern is provided on the inner surface of the molding space. Also, a melted molding material injected into the molding space of the cavity mold 100 or the core mold 20 has an enhanced flow/transfer characteristic and has a low viscosity.

Accordingly, a micrometer or nanometer sized pattern is formed on the surface of the injection moldings formed at the molding space of the cavity mold 100 or the core mold 200. The surface of the injection moldings having the pattern thereon has an optical characteristic, a super-hydrophobic characteristic, etc.

The pattern of the injection moldings can be applied to a product for prevention of a counterfeit.

The pattern has a size enough to form a hologram. The injection moldings having a hologram may be a product that constitutes an appearance of a refrigerator, or the injection moldings may be attached onto an outer surface of a refrigerator. When the pattern that represents a hologram is provided at a door or a body of a refrigerator, the refrigerator can have an enhanced appearance.

The pattern has a size enough to implement a super-hydrophobic characteristic, and the injection moldings having a super-hydrophobic characteristic may be a product inside a refrigerator. When the injection moldings having a super-hydrophobic characteristic is applied to a heat exchanger for a condenser or a heat exchanger for an evaporator of a refrigerator, the heat exchanger for a condenser or the heat exchanger for an evaporator has an enhanced heat exchange efficiency.

Furthermore, since the melted molding material has an enhanced flow/transfer characteristic and has a low viscosity, the melted molding material is rapidly filled in the molding space of the cavity mold or the core mold. Also, since the filled molding material is directly cooled, a time for forming the injection moldings having a pattern thereon is shortened.

The present invention has the following effects.

A micrometer or nanometer sized pattern is formed on an inner surface of the molding space of the cavity mold and the core mold, or the patterning stamp having a micrometer or nanometer sized pattern is provided on an inner surface of the molding space of the cavity mold and the core mold. A melted molding material injected into the molding space of the cavity mold and the core mold has an enhanced flow/transfer characteristic, and has a low viscosity.

Accordingly, a micrometer or nanometer sized pattern is formed on a surface of injection moldings formed at the molding space of the cavity mold and the core mold. The injection moldings have a super-hydrophobic characteristic and an optical characteristic thereon.

Furthermore, since the melted molding material injected into the molding space of the cavity mold and the core mold has an enhanced flow/transfer characteristic and has a low viscosity, the melted molding material is rapidly filled in the molding space of the cavity mold and the core mold. Also, since the filled molding material is directly cooled, a time for forming the injection moldings having a pattern thereon is shortened thereby to enhance a productivity.

Since the injection moldings have an optical characteristic or a super-hydrophobic characteristic thereon, if the injection moldings are implemented as fins of a heat exchanger, the heat exchanger has a super-hydrophobic characteristic.

Accordingly, water drops formed on the heat exchanger are directly discharged out, thereby maximizing a heat transferring efficiency of the heat exchanger.

When the injection moldings are implemented as a door for a refrigerator, a pattern having an optical characteristic of rainbow colors of a hologram can be provided on a surface of the door for a refrigerator. Accordingly, the door for a refrigerator has an enhanced appearance, so that a user can have mysterious feeling and an enhanced satisfaction degree.

When the injection moldings are implemented as an outer case for home electric appliances such as an air conditioner and a washing machine, a pattern having an optical characteristic of rainbow colors of a hologram can be provided on a partial surface or an entire surface of the outer case. As a result, the home electric appliances can have an enhanced appearance.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. An injection-molding apparatus, comprising:
a cavity mold having a cavity;
a core mold having a core surface to form a molding space for injection moldings when being joined to the cavity mold;
a heating unit for heating the cavity mold or the core mold;
a cooling unit for cooling the cavity mold or the core mold; and
a patterning stamp having a micrometer or nanometer sized pattern and provided on an inner surface of the molding space,
wherein the cooling unit comprises:
a cooling plate movably disposed at a receiving space of the cavity mold so as to be positioned at an opposite side to the cavity; and
a driving unit installed in the receiving space of the cavity mold to drive the cooling plate,
wherein the cooling plate is driven by the driving unit separately from the core mold.

2. The injection-molding apparatus of claim 1, wherein the cooling plate is housed within the receiving space of the cavity mold and separated from the cavity by a partition wall of the cavity mold.

3. The injection-molding apparatus of claim 1, wherein the cooling plate comprises a plate having a certain area and a passage disposed in the plate through which a cooling medium flows.

4. The injection-molding apparatus of claim 1, wherein the cooling plate is formed of a copper material.

5. The injection-molding apparatus of claim 1, wherein the driving unit comprises a hydraulic cylinder.

6. The injection-molding apparatus of claim 1, wherein the driving unit moves the cooling plate to contact the inner surface of the receiving space of the cavity mold when the cavity mold is cooled by the cooling unit and moves the cooling plate to separate from the inner surface of the receiving space of the cavity mold when cooling of the cavity mold is stopped.

7. The injection-molding apparatus of claim 1, wherein the driving unit is configured to push the cooling plate to cause the cooling plate to contact the inner surface of the receiving space of the cavity mold and pull the cooling plate to cause the cooling plate to separate from the inner surface of the receiving space of the cavity mold.

8. The injection-molding apparatus of claim 1, wherein the cooling plate is contacted to an inner surface of the receiving space of the cavity mold while melted molding material is injected into the molding space such that the cavity is cooled down by the cooling plate, and
wherein the cooling plate is separated from the inner surface of the receiving space of the cavity mold while the cavity mold is being heated and is then cooled down.

9. The injection-molding apparatus of claim 1, wherein the heating unit comprises:
an electro-thermal wire disposed at the cavity mold so as to be disposed at a periphery of the cavity; and
a wire for supplying electricity to the electro-thermal wire.

10. The injection-molding apparatus of claim 1, wherein the cavity mold comprises:
a base member;
a body member having the cavity at one side thereof, having a receiving space for the cooling unit at an opposite side to the cavity, and fixedly-coupled to the base member; and
an injecting pipe coupled to the body member so as to be communicated with the cavity, for injecting a melted molding material.

11. The injection-molding apparatus of claim 1, wherein the cavity mold is fixed to a fixing unit of an injection molding machine, and the core mold is mounted at a mover of the injection molding machine thereby to move.

12. The injection-molding apparatus of claim 1, wherein the patterning stamp is formed of a planar plate.

13. The injection-molding apparatus of claim 1, wherein the patterning stamp is formed of a curved plate.

14. The injection-molding apparatus of claim 1, wherein the patterning stamp is provided on an inner surface of the cavity of the cavity mold, or on the core surface of the core mold.

15. The injection-molding apparatus of claim 1, wherein the patterning stamp is fixed to the cavity mold or the core mold by a stamp fixing unit.

16. The injection-molding apparatus of claim 15, wherein the stamp fixing unit comprises:
a supporting member for supporting the patterning stamp; and
a coupling member coupled to the supporting member and the cavity mold, for fixing/releasing the patterning stamp by pressurizing/releasing the supporting member.

17. The injection-molding apparatus of claim 15, wherein the stamp fixing unit uses a vacuum.

18. The injection-molding apparatus of claim 15, wherein the stamp fixing unit comprises:
a suction passage formed at the cavity mold or the core mold so as to be communicated with the cavity of the cavity mold or the core surface of the core mold; and
a vacuum generating unit for sucking the patterning stamp to an inner surface of the cavity or the core surface by applying a vacuum to the suction passage.

19. The injection-molding apparatus of claim 1, wherein the injection moldings fabricated at the molding space formed by the cavity of the cavity mold and the core surface of the core mold have a super-hydrophobic characteristic on a surface thereof by a pattern of the patterning stamp.

20. The injection-molding apparatus of claim 1, wherein the injection moldings fabricated at the molding space formed by the cavity of the cavity mold and the core surface of the core mold have an optical characteristic of a hologram on a surface thereof.

* * * * *